United States Patent Office 3,432,478
Patented Mar. 11, 1969

3,432,478
POLYHYDROXY-CONTAINING UNSATURATED
POLYESTERS AND THEIR PREPARATION
Clayton A. May, Orinda, Calif., assignor to Shell Oil Company, New York, N.Y., a corporation of Delaware
No Drawing. Continuation-in-part of application Ser. No. 330,618, Dec. 16, 1963. This application Nov. 13, 1964, Ser. No. 411,101
U.S. Cl. 260—78.5  18 Claims
Int. Cl. C07c 69/52; C08f 15/16, 19/10

ABSTRACT OF THE DISCLOSURE

Hydroxy-containing unsaturated polyesters of the general formula

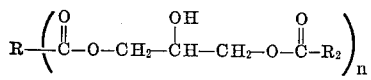

wherein $n$ is an integer of 2 to 10, R is a polyvalent radical derived by removing carboxyl groups from a polycarboxylic acid and $R_2$ is a monovalent radical derived from removing carboxyl groups from an ethylenically unsaturated monocarboxylic acid. Cured products obtained by heating the above-noted polyesters alone or in admixture with a monomer containing a $CH_2=C<$ groups are also disclosed.

---

This application is a continuation-in-part of my application Ser. No. 330,618, filed Dec. 16, 1963 now Patent No. 3,377,406.

This invention relates to new unsaturated polyesters and to their preparation. More particularly, the invention relates to new soluble and curable hydroxy-containing unsaturated polyesters prepared from epoxy esters, to their preparation and to the use of the new polyesters, particularly in the formation of laminated products.

Specifically, the invention provides new and particularly useful soluble and curable hydroxy-containing unsaturated polyesters comprising the reaction product of (1) an ethylenically unsaturated carboxylic acid, such as methacrylic acid, and (2) an epoxy ester of a polycarboxylic acid, such as, for example, diglycidyl adipate. A process for preparing these polyesters by reacting the aforementioned components together in the presence of a catalyst, such as a tertiary amine, phosphine or onium compound, is also provided.

As a special embodiment, the invention provides new acetone-soluble hydroxy substituted unsaturated polyesters which are particularly useful for preparing flexible laminated products which comprise esters of the formula

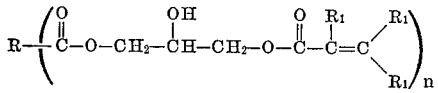

wherein R is a polyvalent radical obtained by removing the carboxyl groups from polymerized unsaturated fatty acids, $R_1$ is hydrogen or a hydrocarbon radical and $n$ is an integer greater than 1 and preferably 2 to 4.

As a further special embodiment, the invention provides compositions containing the above-noted hydroxy-containing unsaturated polyesters and monomeric ethylenically unsaturated compounds, such as, for example, styrene, diallyl phthalate, and the like, and the use of these special compositions for the preparation of cured products having excellent heat, chemical and solvent resistance.

Unsaturated polyesters, such as those obtained by reacting unsaturated polycarboxylic acids or anhydrides, such as maleic anhydride, with glycols as ethylene glycol, have been used for some time in the preparation of laminated products, moldings, castings and the like. The polyesters have left something to be desired, however, because in many cases the cured product fails to have the desired chemical resistance and flexibility in filament wound applications, matched metal die molding, encapsulation and the like.

It is an object of the invention, therefore, to provide a new class of unsaturated polyesters. It is a further object to provide new hydroxy-substituted unsaturated polyesters and a method for their preparation from epoxy esters. It is an object of the invention to provide new hydroxy-substituted unsaturated polyesters that can be cured to form products having excellent flexibility. It is a further object to provide new unsaturated polyesters that can be cured to form products having excellent solvent and chemical resistance. It is a further object to provide new hydroxy-substituted polyesters which can be modified to produce products having a variety of viscosities. It is a further object to provide new polyester compositions containing unsaturated monomers that can be cured to form valuable insoluble infusible products. It is a further object to provide new and valuable laminated products prepared from the aforementioned unsaturated polyesters. These and other objects of the invention will be apparent from the following detailed description thereof.

It has now been discovered that these and other objects may be accomplished by the new products of the invention comprising the reaction product of (1) an ethylenically unsaturated carboxylic acid, such as methacrylic acid, and (2) an epoxy ester of a polycarboxylic acid, such as diglycidyl adipate. It has been found that these new unsaturated hydroxy-substituted polyesters can be easily cured by conventional techniques with peroxides to form products having unexpectedly good flexibility as well as good solvent and chemical resistance. Further, the new polyesters have excellent compatibility with many unsaturated monomers, such as styrene, and can be cured and combined therewith to form low cost products possessing many of the above-noted superior properties. Further, the new polyesters can be modified, as by reaction with polyisocyanates, to form prepolymer compositions which have a variety of viscosities and can be made to suit a variety of applications.

The new hydroxy-substituted ethylenically unsaturated polyesters of the invention are those obtained by reacting epoxy esters of polycarboxylic acids and unsaturated carboxylic acids, preferably in the presence of a catalyst. The epoxy esters used in this reaction are the esters of epoxy-containing alcohols and polycarboxylic acids. Epoxy-substituted alcohols are those monohydric alcohols possessing at least one vic-epoxy group, i.e., a

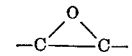

group. Examples of these include, among others, 2,3,-epoxypropanol, 3,4-epoxybutanol, 2,3-epoxybutanol, 3,4-epoxycyclohexanol, 2,3-epoxycyclopentanol, 2,3,5,6-diepoxydodecanol, and the like, and mixtures thereof.

The polycarboxylic acids used in making the esters may be aliphatic, cycloaliphatic, aromatic or heterocyclic and possess two, three or more carboxyl groups. Examples of these include, among others, glutaric, pimelic, adipic, succinic, sebacic, isosebacic, phthalic, isophthalic, azelaic, terephthalic, oxalic, malonic, hexadecanedicarboxylic, diglycolic, azelaic, terephthalic, oxalic, malonic, hexadecanedicarboxylic, diglycolic, thiodivaleric, sulfonyl divaleric, 1,2,4-butanetricarboxylic, diphenyldicarboxylic, diphenic, polyacrylic, p-phenylene diacetic, cis-hexahydroterephthalic, tetrachlorophthalic, maleic, fumaric, tetrahydrophthalic, 2,2-bis(4-carboxyphenyl)propane, and the like, polymerized unsaturated fatty acids, such as dimerized and trimerized fatty acids obtained by heat polymerization of fatty acids under known conditions, such as dimerized, trimerized linoleic acid, linolenic acid, elostearic acids and lecannic acids; adducts of polyunsaturated compounds such as drying oils rosin and the like and maleic anhydride; and carboxyl containing glycerol-polybasic acid polyesters, and mixtures thereof.

The esters prepared from the above may be exemplified by diglycidyl adipate, diglycidyl pimelate, diglycidyl succinate, di(3,4-epoxypentyl) phthalate, diglycidyl 1,2-eicosanedioate, diglycidyl ester of maleic anhydride-rosin adduct, diglycidyl ester of dimerized linoleic acid, triglycidyl ester of 1,2,4-butanetricarboxylic acid, diglycidyl isophthalate, diglycidyl terephthalate, diglycidyl hexahydrophthalate, and diglycidyl tetrachlorophthalate.

Particularly preferred esters are the glycidyl esters and particularly the glycidyl esters of polybasic acids containing from 20 to 70 carbon atoms, and especially the dimerized and trimerized unsaturated fatty acids. These acids are preferably obtained by heating the methyl esters of the acids by the method described in "Industrial and Engineering Chemistry," vol. 38, page 1139 (1946). The structures of the products so obtained are believed to be those given in "Industrial and Engineering Chemistry," vol. 33, page 89 (1941).

The epoxy esters may be obtained by epoxidizing the corresponding unsaturated esters by the method described in U.S. 2,761,870 or by reacting the acids with chlorohydrins as described in U.S. 2,772,296.

The glycidyl esters of the polycarboxylic acids are preferably obtained by reacting a potassium or sodium salt of the acid with epichlorohydrin in the presence of a tertiary amine alkaline material as described in U.S. 2,448,602. Illustrative examples of the preparation of some of these esters are given below.

DIGLYCIDYL ESTER OF DIMERIZED LINOLEIC ACID 90 grams of dimerized linoleic acid was dissolved in benzene and 16.8 parts KOH (19.8 parts of 95% KOH in 15 parts water) stirred into the mixture. The benzene was then distilled off to remove the water. To the dry salt was added 368 parts of epichlorohydrin. The mixture was stirred and heated to 100° C. for ½ hour. The temperature was then maintained at 100° C. to 105° C. for one hour. The salt formed in the reaction (KCl) was filtered off and the excess epichlorohydrin topped off at 110° C. at 1–2 mm. The resulting product was a fluid liquid having an epoxy value of 0.23 eq./100 g. OH value of 0.04 eq/100 g., ester value 0.293.

TRIGLYCIDYL ESTER OF TRIMERIZED LINOLEIC ACID 96 parts of trimer acid (trimerized linoleic acid) was dissolved in 300 parts of benzene and 16.8 parts of KOH (19.8 parts of 85% KOH in 15 parts of water) stirred into the mixture. After stirring for one hour, benzene and water were distilled off leaving solid potassium salt. The salt was broken up and 368 parts of epichlorohydrin added. 1 part of benzene trimethyl ammonium chloride was added as a catalyst. The mixture was heated for 1 hour at 95° C. The mixture was then filtered and the salt washed with benzene. The filtrate was then distilled to remove benzene and excess epichlorohydrin. The resulting product was a liquid having an epoxy value of 0.233 eq./100 g.

GLYCIDYL ESTER OF DIMERIZED ROSIN ACIDS 100 parts of dimerized rosin acids (softening point 145–158° C.) was dissolved in ethyl alcohol and benzene. 14.5 parts of KOH was added to the mixture. After stirring for one hour, benzene and water were distilled off leaving solid potassium salt. The salt was mixed with 230 parts of epichlorohydrin and 1 part of benzyl trimethyl ammonium chloride. The mixture was maintained at 100–105° C. for about 1.5 hours. After cooling, the salt was filtered off and the filtrate distilled at 110° C. at 2 mm. to yield a thick liquid identified as the glycidyl ester of the dimerized rosin acids having an epoxy value of 0.221 eq./100 g.

GLYCIDYL ESTER OF MALEIC ANHYDRIDE 57 parts of an adduct of methyl abietate and maleic anhydride were combined with 29 parts of 85% KOH in 150 parts of water and refluxed 2 hours. The mixture was neutralized to pH of 8–9 and then water was distilled off. 500 parts of benzene were added and distilled to remove last trace of water. 4 mols of epichlorohydrin were then added and the mixture heated to reflux for one hour. The salt was removed by filtration and the mixture distilled to remove excess epichlorohydrin. The resulting ester had an epoxy value of 0.205 eq./100 g.

DIGLYCIDYL ESTER OF 1,20-EICOSANEDIOIC ACID 100 parts of 1,20-eicosanedioic acid was dissolved in 300 parts of benzene and 85% KOH added to the mixture. After stirring for one hour, benzene and water were distilled off leaving solid potassium salt. The salt was broken up and epichlorohydrin added. 1 part of benzene trimethyl ammonium chloride was added as a catalyst. The mixture was heated for 1 hour at reflux. The mixture was then filtered and the excess epichlorohydrin distilled off. The resulting ester had an epoxy value of 0.405 eq./100 g.

The ethylenically unsaturated carboxylic acids to be reacted with the above-described epoxy esters include those organic acids containing at least one ethylenic group, i.e., a $>C=C<$ group. These acids may be monocarboxylic or polycarboxylic and may be aliphatic, cycloaliphatic, or heterocyclic and may be substituted with various substituents, such as halogen atoms, ether radicals, aromatic radicals, phosphorous-containing groups and the like.

Examples of the unsaturated carboxylic acids include, among others, acrylic acid, methacrylic acid, beta-ethylacrylic acid, cyclohexenecarboxylic acid, cyclopentenecarboxylic acid, 2-butenoic acid, maleic acid, chloromaleic acid, tetrahydrophthalic acid, 2,4-octadienedicarboxylic acid, 2,4-hexadienoic acid, vinylbenzoic acid, allylbenzoic acid, dodecadienoic acid, and the like, and mixtures thereof. Particularly preferred acids to be used include the ethylenically unsaturated monocarboxylic acids containing from 3 to 12 carbon atoms, and particularly the alkenoic acids containing from 3 to 8 carbon atoms.

Also of particular interest are the partial esters of polycarboxylic acids, and particularly the alkyl, alkenyl, cycloalkyl and cycloalkenyl partial esters of polycarboxylic acids, such as, for example, allyl hydrogen maleate, vinyl hydrogen maleate, allyl hydrogen tetrahydrophthalate, allyl hydrogen succinate, cyclohexenyl hydrogen adipate cyclopentenyl hydrogen phthalate and the like.

The new hydroxy-containing unsaturated polyesters are obtained by reacting any one or more of the above-described epoxy esters with one or more of the above-noted ethylenically unsaturated carboxylic acids, preferably in the presence of a catalyst. Suitable catalysts to be used include the tertiary amines, such as benzyldimethylamine, tributylamine, diphenylethylamine, tricyclohexylamine and the like; phosphines, such as triphenyl phosphine, tricyclohexyl phosphine, butyl diethyl phosphine and the like; and onium salts, and preferably those containing phosphorous, sulfur or nitrogen, such as, for example, the phosphonium, sulfonium and ammonium salts of inorganic acids. Examples of these onium salts include, among others, benzyltrimethylammonium sulfate, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium thiocyanate, triphenylsulfonium chloride, dicyclohexyldiamylphosphonium iodide, benzyltrimethylammonium thiocyanate, and the like, and mixtures thereof.

Preferred onium salts to be employed include those of the formulae

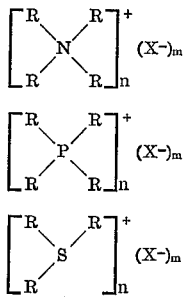

wherein R is a hydrocarbon radical, and preferably an aryl, alkyl, alkenyl, cycloalkyl, cycloalkenyl or alkaryl radical containing up to 12 carbon atoms, X is an ion of an inorganic acid, and particularly a halogen atom, nitrate, sulfate or phosphate radical, $m$ is the valency of the X ion and $n=m$.

The amount of the above-noted epoxy ester and acid to be used in the reaction may vary over a wide range. In general, these reactants are used in approximately chemically equivalent amounts. As used herein and in the appended claims a chemical equivalent amount of the epoxy ester refers to that amount needed to furnish one epoxy group per carboxyl group. Excess amounts of either reactant can be used. Preferred amounts range from about 0.5 to 2 equivalents of epoxy ester per equivalent of carboxylic acid.

The amount of the caylst employed may also vary over a considerable range. In general, the amount of the catalyst will vary from about .05% to about 3% by weight, and more preferably from .1% to 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is not to be used for some time after its formation, it may also be desirable to remove the catalyst used in the preparation, such as by stripping and the like.

Temperatures employed in the reaction will generally vary from about 50° C. to about 150° C. In most cases, the reactants will combine in the presence of the new catalysts at a very rapid rate and lower temperatures will be satisfactory. Particularly preferred temperatures range fom about 50° C. to 120° C.

The reaction will be preferably conducted under atmospheric pressure, but it may be advantageous in some cases to employ subatmospheric or superatmospheric pressure.

The course of the reaction may be conveniently followed by determination of the acidity. The reaction is considered to be substantially complete when the acidity has been reduced to about .020 eq./100 g. or below.

The preparation may be effected in any suitable manner. The preferred method merely comprises adding the epoxy ester, acid, catalyst, and solvent or diluent if desired, in any order and then applying the necessary heat to bring about the reaction. The reaction mixture may then be distilled, extracted or stripped to remove any of the necessary components, such as solvents, catalyst, excess reactants and the like.

The new unsaturated polyester products obtained by the above process will vary from liquids to solid resins. The new products will possess a plurality of free OH groups and a plurality of ethylenic groups, and will be reactive through these groups. The products will be of higher molecular weight than the basic epoxy ester from which they are formed and will possess at least two acid groups per epoxy ester unit.

The polyesters will also possess a linear structure, i.e., free of cross-linking. As a result they will be soluble in actone and other conventional solvents. They will be relatively non-heat reactive, i.e., difficult to body by heating alone. However, constant application of heat may cause them to suddenly gel.

The new polyesters are compatible with and soluble in a great variety of different materials. They will be compatible, for example, with various oils, tars, resins and the like, and with a great variety of different types of ethylenically unsaturated monomers. Examples of such monomers include, among others, aromatic compounds such as styrene, alphamethylstyrene, dichlorostyrene, vinyl naphthalene, vinyl phenol and the like, unsaturated esters, such as acrylic and methacrylic esters, vinyl acetate, vinyl benzoate, vinyl chloroacetate, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl maleate, divinyl adipate, dichloroallyl tetrahydrophthalate, triallyl cyanurate and the like, and mixtures thereof.

The new hydroxy-substituted polyesters may also be used in combination with hydroxy-substituted polyesters obtained by reacting polyepoxide ether compounds with unsaturated acids. Polyepoxide ether compounds used in such reaction includes the glycidyl polyethers of polyhydric phenols and polyhydric alcohols, such as, for example, the glycidyl ethers of resorcinol, 2,2-bis(4-hydroxyphenyl)propane, phenol-formaldehyde condensates, 1,1,2,2-tetrakis(hydroxyphenyl)ethane, and the like, and glycerol, hexanetriol, pentaerythritol, 1,4-butanediol, glycerol-ethylene oxide adducts and the like. The unsaturated acids used in making such polyesters are those described hereinabove. The hydroxy-substituted polyesters prepared from such polyepoxide ethers and acids may be obtained by the same technique used above for making the polyesters from the epoxy esters and acids.

The new hydroxy-substituted polyesters may be polymerized alone in combination with any of the above-noted unsaturated monomers to form valuable polymeric products. When used in combination with the above components, the amount of the other component may vary over a wide range, but it is generally preferred to have at least 15% by weight of the polyester present. In working with components, such as the aromatic unsaturated monomers, such as styrene, it is preferred to utilize from 1% to about 65% of the dissimilar monomer and from 99% to 35% of the new hydroxy-substituted polyester.

The polymerization of the above-noted polyesters or mixtures of monomers may be accomplished by any suitable method. The preferred method comprises heating the monomer or mixture of monomer in the presence of a free radical yielding catalyst. Examples of such catalysts include the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide, tetralin hydroperoxide, phenylcyclohexane hydroperoxide, tertiary butylisopropylbenzene hydroperoxide, tertiary butyl peracetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobiisobutyrate, 2,2'-azobis (2,4-dimethylvaleronitrile), 2,2'-azobiisotuylamide, and the like. Particularly preferred catalysts include the diaroyl peroxide, tertiary alkyl hydroperoxides, alkyl peresters of percarboxylic acids and particularly those of the above-noted groups which contain no more than 18 carbon atoms molecular and have a decomposition temperature below 125° C.

Polymerization accelerators, such as dimethyl aniline, cobalt naphthenate and the like, may also be utilized. Such accelerators are generally utilized in amounts varying from about .01% to about 2% by weight of the mixture.

Other materials may also be added to the mixtures before or during polymerization. This includes plasticizers, stabilizers, extenders, oils, resins, tars, asphalts and the like, as well as all types of coloring or pigments to give the material the desired color.

The above-noted components may be mixed in any order and then the combined mixture heated to the desired temperature. Temperatures employed in the polymerization will vary depending upon the reactants and catalyst selected. In general, the polymerization temperatures may vary from about 20° C. to about 200° C. and more preferably from 20° C. to 150° C.

The unsaturated polyesters and their above-noted mixtures with other monomers may be utiilzed in a wide variety of different applications. They may be utilized in the preparation of coatings and impregnating compositions, in the preparation of adhesives for metals, wood, cement and the like, and in the preparation of reinforced composite products, such as laminated porducts, filament windings and the like. In this latter application, the polyester compositions are applied to the fibrous products, such as glass fibers or sheets, the material formed into the desired object and heated to effect cure of the polyester composition.

To illustrate the manner in which the invention may be carried out, the following examples are given. It is to be understood, however, that the examples are for the purpose of illustration and the invention is not to be regarded as limited to any of the specific conditions or reactants recited therein. Unless otherwise specified, parts described in the examples are parts by weight.

Example I

This example illustrates the preparation of a hydroxy-substituted unsaturated polyester by reacting a glycidyl ester of dimerized linoleic acid, having an epoxy value of 0.229 eq./100 g. and an ester value of 0.278 eq./100 g. with methacrylic acid.

100 parts of the glycidyl ester were combined with 20.2 parts of glacial methacrylic acid and 0.420 part of tetramethyl ammonium chloride and .03 part hydroquinone inhibitor and the mixture heated at 100° C. for 4½ hours. During that time, the acidity changed from .194 to .026 indicating there was substantially complete reaction. The resulting product was a viscous liquid soluble in acetone and benzene and identified as having the structure:

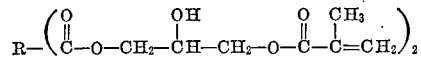

wherein R is the residue of the dimerized acid. Analysis: epoxy value 0.018 eq./100 g., hydroxyl value 0.22 eq./100 g., ester value 0.413 eq./100 g., and acidity 0.017 eq./100 g.

The polyester prepared above was combined with .5% ditertiary butyl peroxide and the mixture heated to 115° C. The resulting product was a hard, tough flexible solvent insoluble casting.

The above polyester was also combined with styrene in ratio of 95/5, 90/10, 80/20 and 60/40 and the mixture combined with .5% ditertiary butyl peroxide and heated at 115° C. The resulting products were hard and tough, and flexible and had good chemical resistance.

The above-noted compositions containing styrene and peroxide catalyst are used to make a glass cloth laminate by conventional procedure wherein the mixture is applied to the glass cloth sheets, the sheets laced together and cured at 125° C. and elevated pressure. The resulting products are hard tough solvent resistant laminated products.

Example II

Example I was repeated with the exception that the unsaturated acid employed was acrylic acid. Related results are obtained.

Example IIII 100 parts of diglycidyl isophthalate were combined with 62 parts of glacial methacrylic acid and 0.57 part of tetramethyl ammonium chloride and the mixture heated at 115° C. for several hours. During that time, the acidity changed from 0.445 eq./100 g. to 0.021 eq./100 g. indicating there was substantially complete reaction. The resulting product was a soft solid soluble in acetone and benzene.

The polyester prepared above was combined with 1% benzoyl peroxide and the mixture heated at 115° C. The resulting product was a tough flexible and solvent insoluble casting.

The above polyester was also combined with styrene in a ratio of 95/5, 90/10, 80/20 and 60/40 and the mixtures combined with .5% ditertiary butyl peroxide and heated at 115° C. The resulting products were hard and tough and flexible and had good chemical resistance.

The above-noted compositions containing styrene and peroxide catalyst are used to make a glass cloth laminate by conventional procedure wherein the mixture is applied to the glass cloth sheets, the sheets laced together and cured at 125° C. and elevated pressure. The resulting products are hard tough solvent resistant laminated products.

Example IV 100 parts of diglycidyl adipate were combined with 67 parts of glacial methacrylic acid and 0.58 part of tetramethylammonium chloride and the mixture heated at 115° C. for several hours. At the completion of the reaction as indicated by the reduced acidity, the mixture was cooled and stripped. The resulting product was a soft solid soluble in acetone and benzene.

The polyester prepared above was combined with .5% ditertiary butyl peroxide and the mixture heated to 115° C. The resulting product was a hard, tough, flexible solvent resistant casting.

The above polyester was also combined with diallyl phthalate in a ratio of 95/5, 90/10 and 60/40 and the mixtures combined with .5% ditertiary butyl peroxide and heated at 115° C. The resulting products were hard and tough, flexible and had good chemical resistance.

The above-noted compositions containing styrene and peroxide catalyst are used to make a glass cloth laminate by conventional procedure wherein the mixture is applied to the glass cloth sheets, the sheets laced together and cured at 125° C. and elevated pressure. The resulting products are hard tough solvent resistant laminated products.

Example V 50 parts of the polyester prepared in Example I was combined with 50 parts by weight of a polyester obtained by reacting glycidyl polyether of 2,2-bis(4-hydroxyphenyl)propane. To this mixture was added 1% by weight of benzoyl peroxide and the mixture heated to 115° C. The resulting product was a tough flexible and solvent insoluble casting.

Example VI

Example V was repeated with the exception that 30% by weight of styrene was added and the mixture used to prepare a glass cloth laminate. The resulting product was a hard tough laminated product having good solvent resistance.

Example VII

Examples I, II and III are repeated with the exception that the styrene is replaced with equal amounts of the following: diallyl phthalate, triallyl cyanurate, divinyl benzene and ethylene glycol dimethacrylate. Related results are obtained.

I claim as my invention:

1. Hydroxy-containing unsaturated polyesters of the general formula $$R \!-\!\!\left(\!\!\begin{array}{c}O\\\|\\C\!-\!O\!-\!CH_2\!-\!\overset{OH}{\underset{}{C}H}\!-\!CH_2\!-\!O\!-\!\overset{O}{\underset{\|}{C}}\!-\!R_2\end{array}\!\!\right)_{\!n}$$

wherein $n$ is an integer of 2 to 10, R is a polyvalent radical derived by removing carboxyl groups from a polycarboxylic acid and $R_2$ is a monovalent radical derived from removing carboxyl groups from an ethylenically unsaturated monocarboxylic acid.

2. New hydroxy-containing ethylenically unsaturated polyesters of the general formula $$R \!-\!\!\left(\!\!\begin{array}{c}O\\\|\\C\!-\!O\!-\!CH_2\!-\!\overset{OH}{\underset{}{C}H}\!-\!CH_2\!-\!O\!-\!\overset{O}{\underset{\|}{C}}\!-\!\overset{R_1}{\underset{R_1}{C}}\!=\!C\!\!<\!\!\begin{array}{c}R_1\\R_1\end{array}\end{array}\!\!\right)_{\!n}$$

wherein $n$ is an integer of 2 to 10, R is polyvalent radical derived by removing carboxyl groups from a polycarboxylic acid, and $R_1$ is a member of the group consisting of hydrogen and hydrocarbon radicals.

3. Hydroxy-containing unsaturated polyesters of the general formula $$R \!-\!\!\left(\!\!\begin{array}{c}O\\\|\\C\!-\!O\!-\!CH_2\!-\!\overset{OH}{\underset{}{C}H}\!-\!CH_2\!-\!O\!-\!\overset{O}{\underset{\|}{C}}\!-\!R_3\end{array}\!\!\right)_{\!n}$$

wherein $n$ is an integer of 2 to 10, R is a polyvalent radical derived by removing carboxyl groups from a polycarboxylic acid and $R_3$ is a radical derived from an alkenoic acid containing from 3 to 12 carbon atoms.

4. A hydroxy-containing unsaturated polyester as in claim 3 wherein the alkenoic acid is acrylic acid.

5. A hydroxy-containing unsaturated polyester as in claim 3 wherein the alkenoic acid is methacrylic acid.

6. A hydroxy-containing unsaturated polyester as in claim 3 wherein the glycidyl ester is diglycidyl ester of dimerized linoleic acid.

7. A hydroxy-containing unsaturated polyester as in claim 3 wherein the glycidyl ester is a glycidyl ester of trimerized linoleic acid.

8. A hydroxy-containing unsaturated polyester as in claim 3 wherein the glycidyl ester is a glycidyl ester of isophthalic acid.

9. A hydroxy-containing unsaturated polyester as in claim 3 wherein the glycidyl ester is glycidyl ester of adipic acid.

10. A composition comprising a mixture of the hydroxy-containing unsaturated polyester defined in claim 1 and a dissimilar ethylenically unsaturated monomer.

11. A composition comprising a mixture of 25% to 98% by weight of the hydroxy-containing unsaturated polyester defined in claim 2 and 75% to 2% by weight of an ethylenically unsaturated monomer containing a $CH_2\!=\!C\!<$ group.

12. A composition comprising a mixture of 25% to 98% by weight of the hydroxy-containing unsaturated polyester defined in claim 2 and 75% to 2% by weight of an alkenyl-substituted aromatic compound.

13. A composition comprising a mixture of the hydroxy-containing unsaturated polyester defined in claim 6 and styrene.

14. A composition comprising a mixture of the hydroxy-containing unsaturated polyester defined in claim 6 and diallyl phthalate.

15. A composition comprising a mixture of the hydroxy-containing unsaturated polyester in claim 6 and a hydroxy-containing unsaturated polyester obtained by reacting a glycidyl polyether of a polyhydric phenol with an acrylic acid.

16. A method for preparing the hydroxy-containing polyester defined in claim 1 which comprises mixing and reacting the epoxy ester of the polycarboxylic acid with the ethylenically unsaturated monocarboxylic acid in the presence of a catalyst of the group consisting of tertiary amines and phosphines.

17. A cured insoluble product obtained by heating the hydroxy-containing polyester of claim 10 in the presence of a peroxide polymerization catalyst.

18. A cured insoluble product obtained by heating the composition of claim 10 in the presence of a peroxide catalyst.

References Cited

UNITED STATES PATENTS

| | | | |
|---|---|---|---|
| 2,781,333 | 2/1957 | Updegraff | 260—78.5 |
| 3,247,145 | 4/1966 | Masters et al. | 260—78.5 XR |
| 3,277,062 | 10/1966 | Goppel et al. | 260—78.4 |
| 2,866,767 | 12/1958 | Fang. | |

JOSEPH L. SCHOFER, *Prmary Examiner.*

J. KIGHT III, *Assistant Examiner.*

U.S. Cl. X.R.

260—18, 837, 485